United States Patent [19]
Mohr et al.

[11] Patent Number: 4,853,510
[45] Date of Patent: * Aug. 1, 1989

[54] INDUCTION HEATING COIL

[75] Inventors: Glenn R. Mohr, Linthicum, Md.;
Donald J. Roth, Westport, Conn.

[73] Assignee: Continental Can Company, Inc., Norwalk, Conn.

[*] Notice: The portion of the term of this patent subsequent to Jul. 12, 2005 has been disclaimed.

[21] Appl. No.: 217,700

[22] Filed: Jul. 11, 1988

Related U.S. Application Data

[63] Continuation of Ser. No. 000,076, Jan. 2, 1987, Pat. No. 4,757,175.

[51] Int. Cl.⁴ .............................................. H05B 6/40
[52] U.S. Cl. .............................. 219/10.79; 219/10.53; 156/380.2
[58] Field of Search ............... 219/10.53, 10.43, 10.79, 219/10.491; 156/272.4, 274.2, 379.7, 380.2

[56] References Cited

U.S. PATENT DOCUMENTS

| | | | |
|---|---|---|---|
| 2,459,971 | 1/1949 | Stanton | 219/10.79 X |
| 2,474,703 | 6/1949 | Story | 219/10.79 X |
| 3,303,314 | 2/1967 | Kuhlbars | 219/10.79 X |
| 3,548,140 | 12/1970 | O'Neill | 219/10.43 X |
| 3,727,022 | 4/1973 | Hamilton | 219/10.43 |
| 3,737,613 | 6/1973 | Gillock | 219/10.79 |
| 3,748,422 | 7/1973 | Schafer | 219/10.53 |
| 3,766,353 | 10/1973 | Barbieux | 219/10.79 X |
| 3,846,609 | 11/1974 | Enk | 219/10.79 |
| 4,757,175 | 7/1988 | Mohr et al. | 219/10.79 |

FOREIGN PATENT DOCUMENTS

| | | |
|---|---|---|
| 540519 | 12/1931 | Fed. Rep. of Germany . |
| 886943 | 8/1953 | Fed. Rep. of Germany . |
| 1085160 | 1/1955 | France . |

Primary Examiner—Philip H. Leung
Attorney, Agent, or Firm—Charles E. Brown; Paul Shapiro; Charles A. Brown

[57] ABSTRACT

This relates to an induction heating coil which is of a single turn construction and particularly configurated for inducing electrical energy into a metal foil barrier layer of a laminated container closure for effecting heat bonding of the closure to a container in a preselected seal pattern. The seal pattern contains either one corner or the closure is provided with a projecting pull tab wherein there is a greater heating requirement and thus a requirement for the induction of higher electrical energy into the closure. The need for the induction of a greater amount of heat into the closure at a corner or the location of a projecting pull tab is provided for by reducing the cross section of the heating coil at the location of the greater heat requirement. The reduction in cross section is primarily effected by forming a notch in the heating coil. If desired, a closer control of the heating effect of the coil may be obtained by positioning in the notch a ferrite insert.

3 Claims, 1 Drawing Sheet

U.S. Patent
Aug. 1, 1989
4,853,510
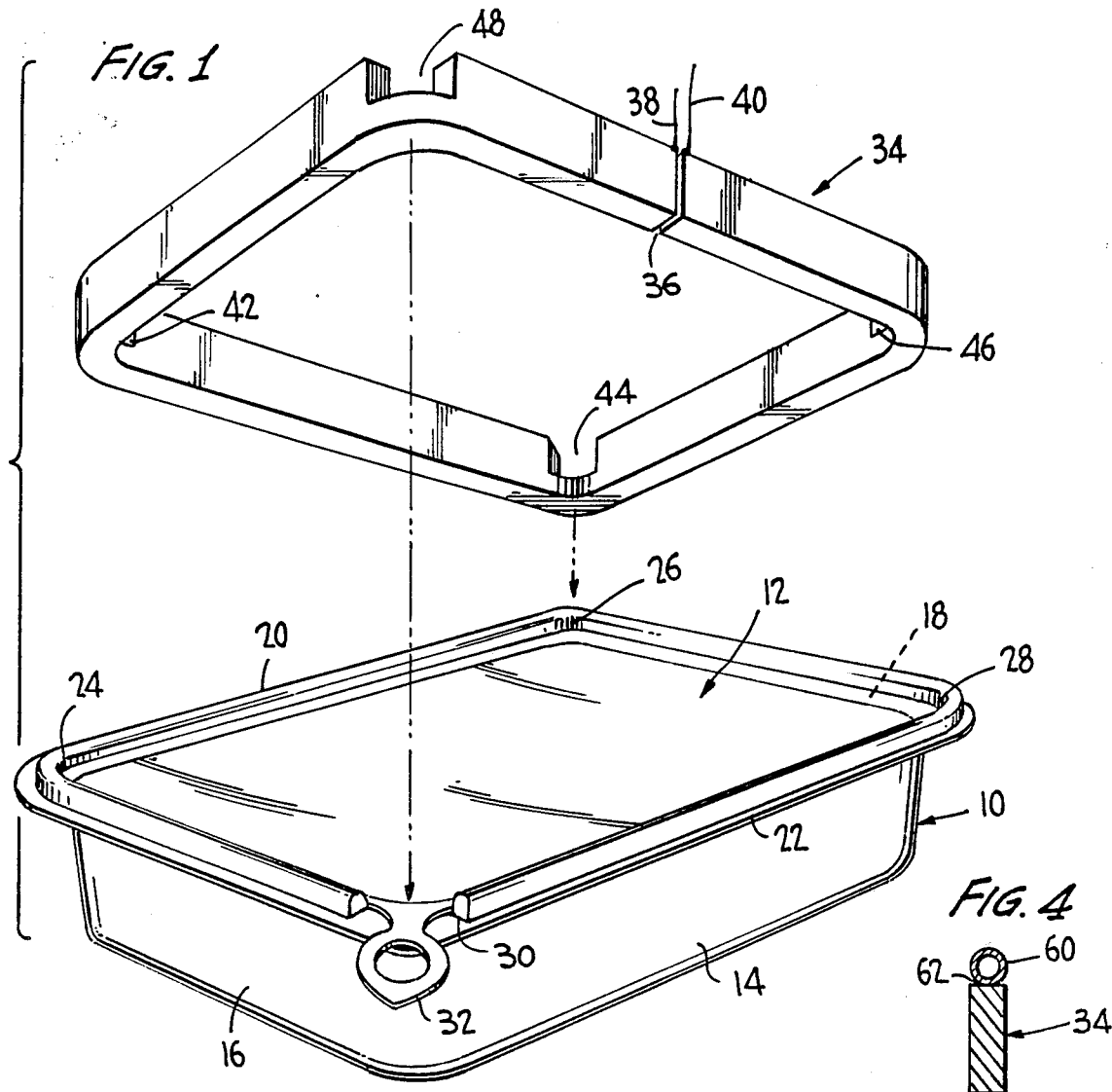
FIG. 1
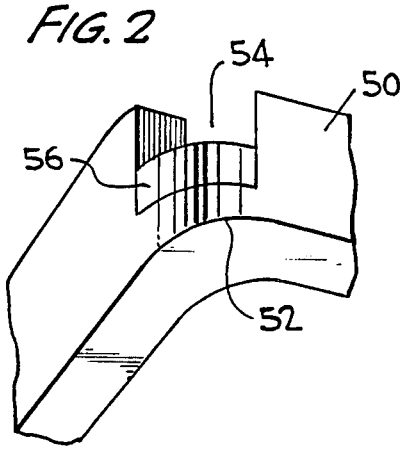
FIG. 2
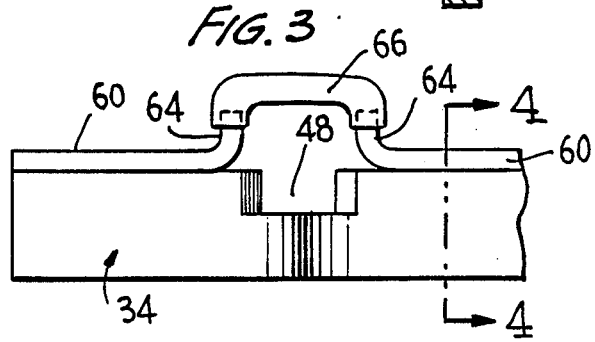
FIG. 3
FIG. 4
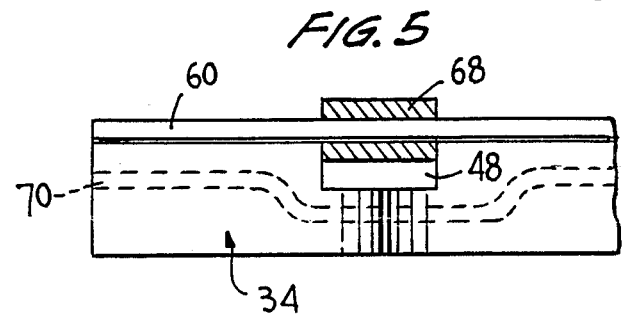
FIG. 5

INDUCTION HEATING COIL

This application is a continuation of our copending application Ser. No. 07/000,076, Filed Jan. 2, 1987, now U.S. Pat. No. 4,757,175.

This invention relates in general to new and useful improvements in induction heating coils, and more particularly to an induction heating coil for heating a laminated closure including a metal foil barrier layer to effect the bonding of the closure to a container.

Considerable work is being done in forming asceptic packages wherein a laminated plastic closure is applied in completely sealed relation to a laminated plastic container and wherein the closure is provided with a pull tab so that the package may be opened by merely rupturing the bond between the closure and the container in a peeling like action. It is believed that the most effective way of forming a bond between the closure and the container is by way of a heat bond between two plastic outer layers, one of the container and one of the closure. Further, it has been found that the most effective way of heating the plastic layers is by way of induction heating utilizing in the closure a metal foil barrier layer, with the metal foil primarily being an aluminum foil.

If the bond pattern is circular, problems of heat control are minimal. However, when the closure is provided with a pull tab, this has posed a heating problem in that heating at the pull tab is different from heating along the remainder of the periphery of the closure. The closure is normally heat sealed about its periphery so that there is only a heat loss radially inwardly of the pattern of heating. However, since the pull tab also incorporates a portion of the metal foil barrier, in the area of the pull tab there is additionally outwardly directed heating loss. Thus more heat must be applied to the closure in the area of the pull tab. More heat requires a concentrated magnetic field.

Also, when the bond pattern between the closure and the container includes one or more corners there results in a change of current distribution at the corners of the metal foil which reduces the heating of the metal foil in the corners.

In the past, induction coils of constant cross section have been utilized with the heating in the corners and the tab area being controllably increased by the utilization of added magnetic materials, such as ferrite. In addition, a metal plate has been incorporated within the coil so as to concentrate the heating of the metal foil.

This invention relates to the utilization of a simple induction heating coil which for all practical purposes eliminates the centrally located plate and reduces to the minimum the use of added magnetic materials. The invention in particular relates to the finding that a reduction in a cross sectional area of a coil may be advantageously utilized to increase the inductance and thereby the heating. Most particularly, by controllably reducing the cross section of the induction heating coil at the corners or at the pull tab, the desired differential in heating at the corners and pull tab as opposed to the ends and sides of the closure may be obtained.

Furthermore, in accordance with this invention, it has been found that the reduction in cross section of the induction heating coil may be simply effected by notching the coil and, if found beneficial, to add magnetic material in the notches.

With the above and other objects in view that will hereinafter appear, the nature of the ivnention will be more clearly understood by reference to the following detailed description, the appended claims, and the several views illustrated in the accompanying drawing.

FIG. 1 is an exploded perspective view showing a rectangular container having seated thereon a closure incorporating an aluminum foil barrier layer, and an induction heating coil in accordance with this invention for specifically heating the closure and bonding the same to the container.

FIG. 2 is an enlarged fragmentary perspective view of one corner of the induction heating coil incorporating therein magnetic material to increase the inductance of that portion of the coil.

FIG. 3 is an elevational view of a corner of a modified form of induction heating coil having cooling means.

FIG. 4 is a fragmentary vertical sectional view taken generally along the line 4—4 of FIG. 3 and shows the general construction of the coil and the cooling means therefore.

FIG. 5 is a fragmentary elevational view of a corner of still a further modified heating coil.

Referring to the drawings in detail, it will be seen that there is illustrated in FIG. 1 a container 10 to which a closure 12 is to be heat bonded. The container 10 and the closure 12 per se are known.

In a known manner, the container 10 is rectangular in outline and includes sides 14 and ends 16 which extend upwardly from a bottom thereof. The sides 14 and the ends 16 terminate in an upper sealing flange 18 which is generally defined by an upstanding bead 20 which, in turn, terminates in an outwardly and downwardly directed lip 22. The bead 20 defines three corners 24, 26 and 28 which are substantially identical. The bead 20 also terminates at opposite sides of a fourth corner 30.

The closure 12 is also rectangular in outline and of a configuration to be seated on and sealed to the sealing flange 18. Like the sealing flange, the closure 12 has four corners and at one of these corners there is a pull tab 32. The pull tab 32 extends radially outwardly at the corner 30 between the remote ends of the bead 22.

It is to be understood that the closure 12, like the container 10, is of a laminated construction. However, the closure 12 includes an aluminum foil barrier layer into which electrical energy may be induced utilizing an induction heating coil. Such a heating coil is also illustrated in FIG. 1 and is generally identified by the numeral 34.

A typical heating coil is of a one turn construction and is rectangular in cross section as is clearly shown in FIG. 1. Adjacent ends of the heating coil 34 are spaced apart and preferably insulated by means of an insulated separator 36. Leads 38 and 40 from a high frequency electrical power source are coupled to the opposite ends of the coil 34.

In use, as is the current practice, the flange area of the container 10 is supported on a suitable support and the lid 12 is loosely positioned in overlying relation to the interior of the container 10, resting on the sealing flange 18. The heating coil 34 is then brought into pressure engagement with the surface of the closure 12 about the preiphery thereof and the required high frequency electrical energy is directed to the heating coil 34 for a limited period of time. Actually the time available for the heating and bonding of the closure 12 is very short. Furthermore, the plastic layers of the closure 12 and the container 10 which are to be heat bonded together must be heated from the aluminum foil barrier layer while at the same time the temperature of the aluminum foil barrier layer must be held to one wherein neither melting of the aluminum foil nor destruction of the bond between the aluminum foil barrier layer and the next adjacent plastic layer will be effected.

At this point it is to be noted that if the cross section of the induction heating coil 34 were constant, and such a heating coil were utilized in the heating of the cover 12 to effect the bonding thereof to the container 10, controlled uniform heating of the closure 12 and the bonding thereof to the container 10 along the sides and ends thereof would present no problem. Furthermore, such heat bonds or seals could be readily ruptured in a peeling action utilizing the pull tab 32. However, there would be improper heating at the four corners of the closure 12 and most particularly in the area of the pull tab 32. As previously explained, in the corners of the closure 12, the distribution of current induced into the aluminum foil barrier layer changes. The net result would be incomplete heating of the corners.

In a like manner, while along the sides and ends of the closure 12 heat is only dissipated there inwardly, in the case of the pull tab 32, heat is also dissipated outwardly. Thus even if the pull tab were not at a corner of the closure 12, but along one of the ends or sides, there would not be a proper seal.

On the other hand, if the electrical energy induced into the aluminum foil barrier layer were sufficient to provide proper bonding at the corners and at the pull tab 32, then there would be overheating along the sides and ends of the closure 12. Accordingly, more electrical energy must be induced into the aluminum foil barrier layer at the corners of the closure and at the pull tab 32. In accordance with this invention, this has been effected by simply reducing the cross section of the induction heating coil 34 at the corners thereof. Furthermore, this has been simply accomplished by notching the induction heating coil 34 from one edge thereof. It is to be noted that the induction heating coil 34, being rectangular in cross section, has two sides and upper and lower edges. Thus the coil 34 has its cross section reduced by notches 42, 44 and 46 which correspond to the corners 24, 26 and 28 of the container 10. Further, there is a much wider notch 48 at the corner 30 in view of the fact that at the corner 30 there is also the pull tab 32. By properly controlling the depth of the notches 42, 44, 46 and 48 as well as the circumferential extent thereof, the inductance can be controlled and there can be a greater heating of the aluminum foil barrier at the corners and generally in alignment with the pull tab 32.

The notches 42, 44, 46 and 48 are disposed uppermost so that the then lower edge of the induction heating coil 34 will be in continuous contact with the upper surface of the closure 12 to assure the proper pressure contact between the closure 12 and the container 10 to effect the desired pressure heat bonding.

With reference to FIG. 2, there is illustrated a modified form of induction heating coil generally identified by the numeral 50. The coil 50 is of the same construction as the induction heating coil 34 and includes a corner 52 having a notch 54. However, the coil 50 differs from the coil 34 in that there is seated within the notch 54 a piece of magnetic material 56 which may be in the form of a ferrite. The introduction of the magnetic material will also increase the inductance and may be used as a minor control as opposed to the necessity of extremely accurate determination of the size of the notches.

If desired, the coil 34 may be provided with cooling means in the form of a copper tube 60 which may be bonded to the upper edge surface of the coil 34 by way of silver solder 62. The illustrated corner may be the corner having the notch 48 therein. It will be seen that the tube 60 is interrupted at the corner and each section of the tube is provided with an end portion 64 which is turned generally at right angles to the adjacent portion of the tube. The two sections of the tube are joined together by a length of plastic tubing 66 which is non-conductive and therefore has no influence whatsoever on the inductance of the coil.

In FIG. 5 there is illsutrated another modification of the coil 34 showing a representative corner, such as the corner having the notch 48 therein. Once again the coil 34 has been provided with the cooling tube 60. However, in lieu of the cooling tube 60 being formed in sections which are joined together in general alignment with the notch 48 by a plastic tube, the copper tube 60 is continuous. However, so that the copper tube will not modify the effect of the notch 48 on the inductance of the coil, that portion of the tube 60 which bridges the notch 48 is encased in a section of ferrite 68.

As a result, the general current flow through the coil 34 will be directed beneath the notch 48 as is illustrated by the lines 70.

Although only several preferred embodiments of the induction heating coil have been specifically illustrated and described herein, it is to be understood that minor variations may be made therein without departing from the spirit and scope of the invention as defined by the appended claims.

We claim:

1. An induction heating coil, said coil being a single turn coil particularly configured for inducing electrical energy into a metal foil barrier layer of a laminated container closure for effecting heat bonding of the closure to a container in a preselected seal pattern with the closure having configuration means which modified the distribution of current into said closure, said coil having an outline in accordance with said preselected seal pattern, said coil being improved by reducing the cross section of said coil in alignment with the intended position of the closure configuration means to increase inductance and thus the heating effect of said coil at the closure configuration means, said reduction in cross section being in the form of a notch disposed remote from the plane of the intended seal pattern, said coil having a cooling tube portion, and said cooling tube portion extending across said notch in a manner without changing the increased inductance of said coil at said notch.

2. An induction heating coil according to claim 1 wherein magnetic material is seated in said notch in accordance with the planar outline of said notch to further increase inductance of said coil.

3. An induction heating coil, said coil being a single turn coil particularly configured for inducing electrical energy into a metal foil barrier layer of a laminated container closure for effecting heat bonding of the closure to a container in a preselected seal pattern with the closure having configuration means which modified the distribution of current into said closure, said coil having an outline in accordance with said preselected seal pattern, said coil being improved by reducing the cross section of said coil in alignment with and normal to the intended position of the closure configuraton means to increase inductance and thus the heating effect of said coil at the closure configuraton means, the reduction in cross section being in the form of a notch, and magnetic material being seated in said notch in accordance with a planar outline of said notch to further increase inductance of said coil.

* * * * *